United States Patent [19]

Hasegawa et al.

[11] Patent Number: 4,923,904

[45] Date of Patent: May 8, 1990

[54] PROCESS FOR PRODUCING POLYURETHANE FOAM

[75] Inventors: Hajime Hasegawa, Chigasaki; Taiji Koga, Yokohama; Atsuo Takei, Fujisawa; Toru Okuyama, Sagamihara, all of Japan

[73] Assignee: Bridgestone Corporation, Tokyo, Japan

[21] Appl. No.: 288,244

[22] Filed: Dec. 22, 1988

[30] Foreign Application Priority Data

Dec. 26, 1987 [JP] Japan .................. 62-330685

[51] Int. Cl.$^5$ ............... C08G 18/18; C08G 18/65
[52] U.S. Cl. .................. 521/115; 521/118; 521/129; 521/167; 521/174; 521/176
[58] Field of Search ............ 521/129, 174, 176, 167, 521/115, 118

[56] References Cited

U.S. PATENT DOCUMENTS 4,475,847  10/1984  Cornely et al. .............. 405/264
4,792,576  12/1988  Nodelman .................. 521/174

Primary Examiner—Maurice J. Welsh
Assistant Examiner—Rabon Sergent

[57] ABSTRACT

A process for producing a polyurethane foam from a foam raw material containing polyols, organic isocyanates, catalysts and blowing agents, which comprises using as the polyols a high-molecular weight polyol having a hydroxyl number lower than 100 and a low-molecular weight polyol having a hydroxyl number higher than 200 which are mixed at a ratio of 4:6 to 6:4 (by weight), and also using as the catalysts a tertiary amine alone. Polyurethane forms having good buckling performance can be obtained by the process and they are expected to be useful as a packaging material, shock-absorbing material, heat-insulating material, and so on.

5 Claims, 1 Drawing Sheet

PROCESS FOR PRODUCING POLYURETHANE FOAM

BACKGROUND OF THE INVENTION

1. Field of the Invention

The present invention relates to a process for producing a ployurethane foam having good buckling performance property. The polyurethane foam of the present invention in having this property, is useful as a packaging material, shock-absorbing material, heatinsulating material, and frog (for holding flowers in place in a bowl or base).

2. Description of the Prior Art

There are many instances in which foam materials are used for packaging or shock absorption by causing these materials to buckle. The foam materials for such uses have heretofore been rigid urethane foams or phenolic foams. These conventional foams have the following disadvantages.

(1) They do not buckle in a neat manner.
(2) When they are buckled, they generate powder, which adheres to the packaged goods and contaminates the environment.
(3) They require a high load for buckling.
(4) If they are to have a good buckling performance, it would be necessary for them to be produced batchwise from expensive raw materials. This would lead to their production cost being high and would limit the height of the foam.

SUMMARY OF THE INVENTION

The polyurethane foam of present invention was completed. The completed polyurethane foam of the present invention eliminated the above-mentioned disadvantages.

Therefore, it is an object of the present invention to provide a polyurethane foam which has good buckling performance.

It is another object of the present invention to provide a polyurethane foam which does not generate powder when it is buckled.

To achieve the above-mentioned object, the present inventors carried out series of researches which led to the finding that a polyurethane foam having very good buckling performance can be obtained from foam raw material containing a polyol mixture, organic polyisocyanate, catalyst, and blowing agent, wherein the polyol mixture is composed of a high molecular weight polyol having a hydroxyl number lower than 100 and a low-molecular weight polyol having a hydroxyl number higher than 200 which are mixed in a ratio of 4:6 to 6:4 (by weight), and the catalyst is a tertiary amine which is used alone (not in combination with a tin catalyst or other catalysts). The polyurethane foam resembles a semirigid foam and yet has the proper hardness of a rigid foam. Despite its high degree of hardness, the polyurethane foam can be buckled in a neat manner under a comparatively low load. In addition, unlike conventional rigid foams, it does not generate powder when being buckled. Therefore, the polyurethane foam will be suitable for application in areas where it is used in a buckled state. The present invention was completed on the basis of this finding.

Accordingly, the present invention provides a process for producing a polyurethane foam from a foam raw material containing polyols, organic isocyanates, catalyst, and blowing agents, which comprises using as the polyols a high-molecular weight polyol having a hydroxyl number lower than 100 and a low-molecular weight polyol having a hydroxyl number higher than 200 which are mixed at a ratio of 4:6 to 6:4 (by weight), and also using as the catalyst a tertiary amine alone (not in combination with a common tin catalyst).

The above and other objects, features and advantages of the present invention will be more apparent from the following description.

DETAILED DESCRIPTION OF THE INVENTION

Figure 1:
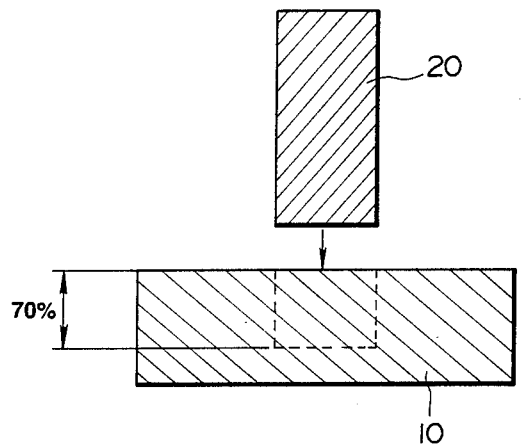
FIG. 1 is a sectional view showing the test method of buckling performance.

The high-molecular weight polyol used in the present invention should have a hydroxyl number of lower than 100, preferably 25 to 100, more preferably 25 to 60. Examples of such polyols include those which are formed by the addition polymerization of ethylene oxide, propylene oxide, butylene oxide, or a mixture thereof on a polyhydric alcohol such as propylene glycol, glycerin, diglyceride, and trimethylolpropane. These polyols should preferably have a molecular weight of from 2,000 to 4,000.

On the other hand, the low-molecular weight polyol used in the present invention should have a hydroxyl number of higher than 200, preferably 200 to 600. Examples of such polyols include those which are formed by the addition polymerization of ethylene oxide, propylene oxide, butylene oxide, or a mixture thereof on a hydroxyl compound such as glycerin and trimethylolpropane or a polyhydric alcohol such as glycerin, pentaerythritol, sorbitol, sucrose, and $\alpha$-methyl glucoside, and trimethylolpropane, or those which are formed by the addition polymerization of ethylene oxide, propylene oxide, butylene oxide, or a mixture thereof on an amine compound such as tolylenediamine, ethylenediamine and diethylenetriamine. These polyols should preferably have a molecular weight of from 200 to 800.

The two polyols should be used in combination in a mixing ratio of from 4:6 to 6:4 by weight. With a mixing ratio outside this range, the polyurethane foam obtained is not satisfactory in buckling performance.

As mentioned above, the process of the present invention employs a tertiary amine alone as the sole catalyst. Examples of the tertiary amine catalyst include aliphatic tertiary amines such as triethylenediamine, triethylamine N,N, N',N'-tetramethyl methyl-1, 3-butanediamine, dimethylethanolamine, ethyldiethanolamine, N, N-dimethylcyclohexylamine, N-ethylmorpholine, N-methylmorpholine, 1,8-diazacyclo (5. 4. 0) undecene-7, bis(2-dimethylaminoethyl)ether, trimethylaminoethyl piperagine, methylhydroxyethyl piperazin, N, N, N', N',-tetramethylhexamethylenediamine, N, N, N', N'-tetramethylpropylenediamine, N, N, N', N', N''-pentamethyl-diethylenetriamine, N-trioxyethylene-N,N-dimethylamine, and N, N, N'-trimethylaminoethyl ethanolamine. They may be used individually or in combination with one another.

These tertiary amines should be used in a catalytic amount which is not specifically limited. The preferred amount is 0.1 to 3 parts by weight for 100 parts by weight of the total amount of polyols used.

The organic isocyanate that can be used in the present invention is one which is commonly used for the production of polyurethane foams. It includes, for example, m-phenylenediisocyanate, p-phenylenediisocyanate, 2,4-tolylene-dissocyanate, 2,6-tolylenediisocyanate, chlorophenylene-2,4-diisocyanate, and crude diphenylmethane diisocyanate and a mixture thereof. The organic isocyanate should be used in an amount of 20 to 70 parts by weight for 100 parts by weight of the total amounts of polyols used.

The blowing agent that can be used in the present invention includes water and common halogenated hydrocarbons such as monofluorotrichloromethane, difluorodichloromethane, dichloromethane, 2,2-dichloro-1,1,1-trichloroethane, and 1,1-dichloro-1-fluoroethane. The blowing agent may be used in an effective amount. Preferably, when water is used, it may be present in amount of 1 to 6 parts by weight for 100 parts by weight of the total amount of polyols used, and when halogenated hydrocarbon is used, it may be present in amount of 1 to 30 parts by weight for 100 parts by weight of the total amount of polyols used.

The above-mentioned raw materials may further contain a flame retardant, pigment, inorganic filler, and the like.

The foaming of the above-mentioned raw materials can be accomplished by either a one-shot process or prepolymer process under various foaming conditions. In the one-shot process, a polyol, isocyanate, water, amine catalyst and, if necessary, an auxiliary agent are independently introduced into a mixing room. Then the components are mixed and the mixture is provided on a conveyor belt and allowed to foam. In the prepolymer process, a prepolymer having an isocyanate terminating group is prepared by reacting a polyol with an excess of an isocyanate, and the thus prepared prepolymer is used as an isocyanate in the one-shot process.

The polyurethane foam obtained by the process of the present invention resembles a semirigid foam and yet has the proper hardness of a rigid foam and good buckling performance. It buckles in a neat manner, with no powder generated, under a comparatively low load. Therefore, it can be buckled without routing in the manner of a flexible foam, and it can be fitted to a complex shape. Because of these characteristic properties, it is useful as a packaging material (for foods, cosmetics, and stationery), shock absorbing material, heat insulating material (for pipers), frog (for natural flowers and artificial flowers), decorating material, medium for hydroponic culture, wadding, and mold, which are buckled or cut to form a shape when used.

As mentioned above, the process of the present invention permits the production of a polyurethane foam which can be buckled in a neat manner to a desired shape, without powdering. The polyurethane foam can be produced from less expensive raw materials than those used for the production of conventional rigid foams. In addition, it can be buckled without routing in the manner of a flexible foam.

The present invention will be explained in more detail with reference to the following examples and comparative examples, which are not intended to limit the scope of the invention. In the examples "parts" means "parts by weight."

[EXAMPLE 1 AND COMPARATIVE EXAMPLES 1 to 5]

Polyurethane foams were prepared according to the formulation and conditions shown in Table 1. A mixture of a high-molecular weight polyol and a low-molecular weight polyol, an organic isocyanate, a mixture of amine catalyst, foam stabilizer and water, freon, and stannous octoate (if used) were introduced into a mixing room at the predetermined flow rate (the flow rate of polyol is 3.5 kg/cm$^3$). Then the components were mixed at a high agitation speed of 4000 rpm and the mixture was provided into a cubical box (600 mm × 600mm × 600mm to prepare a polyurethane foam. The resulting foams were tested for foaming performance and buckling performance. The results are shown in Table 1.

The foaming performance was evaluated according to the following criteria.

A:Excellent

No cracks, no constriction due to the formation of closed cells and no foam down occurred.

B:Good

No cracks and no foam down occurred. Closed cells are slightly produced.

C:Fair

No cracks and no foam down occurred. The constriction due to the formation of closed cells slightly occurred.

D:Poor

No constriction due to the formation of closed cells occurred. Cracks and foam down occurred. The buckling performance was tested and evaluated according to the following method and criteria.

TEST METHOD

Figure 2:
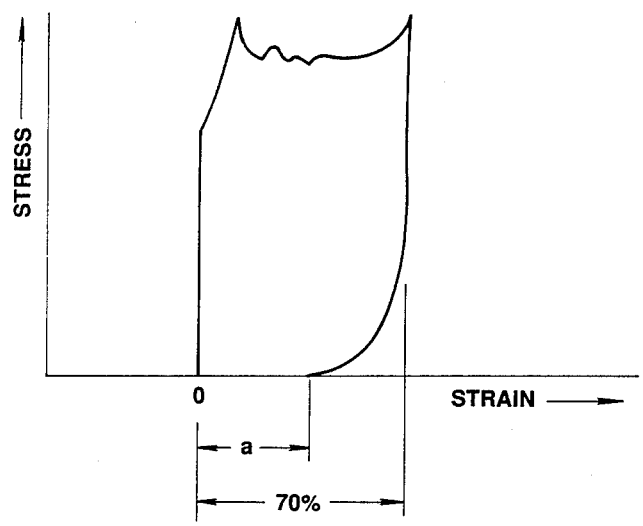
FIG. 2 is a hysteresis curve obtained by compressing a polyurethane foam sample in the buckling performance test.

As shown in FIG. 1, a test sample 10 (polyurethane foam) having a thickness of 50 mm, a length of 200 mm and a width of 200 mm was pressed by an steel cylinder 20 having a diameter of 57 mm in the vertical direction to the surface of sample at a compression speed of 100 mm/min so that the center portion of the sample 10 was compressed at a 70% compression rate. Thereafter the sample 10 was unloaded to obtain a hysteresis curve as shown in FIG. 2. The buckling performance was evaluated from the residual strain rate "a" which is the value when the stress becomes zero after the unloading.

CRITERIA

A:Excellent

The sample can be buckled in a neat manner to a desired shape. The residual strain rate is more than 65%.

B:Good

The sample can be buckled, but not in a neat manner. The residual strain rate is 50 to 65%.

C:Fair

The sample can be somehow buckled, but in a rough manner. The residual strain rate is 35 to 50%.

D:Poor

The sample cannot be buckled. The residual strain rate is less than 25%.

TABLE 1

| Formulation (parts) | Example 1 | Comparative Examples | | | | |
|---|---|---|---|---|---|---|
| | | 1 | 2 | 3 | 4 | 5 |
| High-molecular | 60 | 30 | 10 | 70 | 90 | 50 |

TABLE 1-continued

| Formulation (parts) | Example 1 | Comparative Examples 1 | 2 | 3 | 4 | 5 |
|---|---|---|---|---|---|---|
| weight polyol | | | | | | |
| Low-molecular weight polyol | 40 | 70 | 90 | 30 | 10 | 50 |
| Organic isocyanate | 97 | 97 | 97 | 97 | 97 | 97 |
| Amine catalyst | 0.45 | 0.45 | 0.45 | 0.45 | 0.45 | 0.45 |
| Water | 2.0 | 2.0 | 2.0 | 2.0 | 2.0 | 2.0 |
| Stannous octoate | — | — | — | — | — | 0.1 |
| Foam stabilizer | 0.48 | 0.48 | 0.48 | 0.48 | 0.48 | 0.48 |
| Freon | 7.0 | 7.0 | 7.0 | 7.0 | 7.0 | 7.0 |
| Evaluation | | | | | | |
| Foaming performance | A | C | C | D | D | B |
| Buckling performance | A | C | C | D | D | D |

Notes to Table 1
*[1]OH number: 56, molecular weight: 3000 (Voranol 3022J; a product of Dow Chemical)
*[2]OH number: 570, molecular weight: 400 (CA 203; a product of Sanyo Kasei Co., Ltd.)
*[3]A 80:20 mixture of

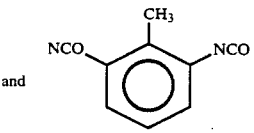

(TDI KZ; a product of Takeda Chemical Industries, Ltd.)
*[4]A dipropylene glycol solution containing 33% of

(DABCO 33LV; a product of Toso Co., Ltd.)
*[5]Polyoxyalkylene-silicone copolymer (L-520; a product of Nippon Unicar Co., Ltd.)
*[6]F-11, $CCl_3F$ (a product of Asahi Glass Co., Ltd.)

It is noted from Table 1 that the polyurethane foam obtained according to the process of the present invention has superior foaming performance and buckling performance.

[EXAMPLE 2 AND COMPARATIVE EXAMPLE 6 AND 7]

Polyurethane foams were prepared in the same procedure as in Example 1 according to the formulations and conditions shown in Table 2 except that the polyol was introduced as an independent stream into the mixing room when the high-molecular weight polyol or the low-molecular weight polyol was used alone in Comparative Examples 6 and 7. The resulting foams were tested for performance as a packaging material and frog. The results are shown in Table 2.

The performance as a packaging material was ranked according to the following criteria in the case where an object is pushed against the polyurethane foam for packaging by buckling.
A:Easily buckled without great resistance and spring-back.
B:Buckled with some resistance, but not in a very neat manner.
C:Unsuitable for packaging due to complete spring-back.

The performance as a frog was ranked according to the following criteria.
A:Can hold many flowers firmly.
B:Cannot hold flowers firmly; easily broken when many flowers are thrusted in.
C:Cannot hold flowers at all.

TABLE 2

| Formulation (parts) | Example 2 | Comparative Examples 6 | 7 |
|---|---|---|---|
| High-molecular weight polyol*[1] | 50 | — | 100 |
| Low-molecular weight polyol*[2] | 50 | — | — |
| Low-molecular weight polyol*[7] | — | 100 | — |
| Organic isocyanate*[3] | 93 | — | 105 |
| Organic isocyanate*[8] | — | 108 | — |
| Amine catalyst*[4] | 0.45 | — | 0.45 |
| Water | 2.0 | 0.5 | 3.5 |
| Stannous octoate | — | — | 0.20 |
| Foam stabilizer*[5] | 0.48 | — | 1.0 |
| Foam stabilizer*[9] | — | 0.5 | — |
| Freon*[6] | 7.0 | 30.0 | 5.0 |
| Dimethylcyclohexylamine*[10] | — | 1.5 | — |
| Evaluation | | | |
| As a packaging material | A | B | C |
| As a frog | A | B | C |

Comparative Example 6: Conventional formulation for rigid foam.
Comparative Example 7: Conventional formulation for flexible foam.
Notes to Table 2
*[7]OH number: 450, molecular weight: 600 (SANNIX HS 209; a product of Sanyo Kasei Co., Ltd.)
*[8]Represented by the formula below. (MDI KZ; a product of Sumitomo Bayer Co., Ltd.)

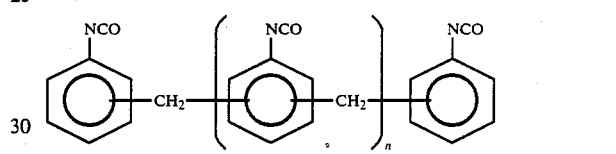

*[9]Polyoxyalkylene-silicone copolymer (L-5420; a product of Nippon Unicar Co., Ltd.)
*[10]Represented by the formula below. (a product of Toso Co., Ltd.)

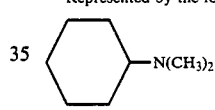

It is noted from Table 2 that the polyurethane foam obtained according to the process of the present invention has such superior buckling performance that it is suitable for use as a packaging material and frog.

What is claimed is:

1. A process for producing a polyurethane foam having good buckling performance by a one-shot process or prepolymer process which comprises:
    mixing a raw material comprising polyols, an organic isocyanate, a catalyst and a blowing agent, said polyols consisting of a mixture of a high-molecular weight polyol having a hydroxyl number of from 25 to 100 and a molecular weight of from 2000 to 4000 and a low-molecular weight polyol having a hydroxyl number of from 200 to 600 and a molecular weight of from 200 to 800 at a weight ratio of 4:6 to 6:4, and said catalyst consisting of a tertiary amine, wherein said organic isocyanate is used in an amount of from 20 to 70 parts by weight for 100 parts by weight of the total amount of said polyols, and said catalyst is used in an amount of from 0.1 to 3 parts by weight for 100 parts by weight of the total amount of said polyols, and
    foaming said raw material to obtain a polyurethane foam.

2. The process according to claim 1, wherein the hydroxyl number of the high-molecular weight polyol is from 25 to 60.

3. The process according to claim 1, wherein the tertiary amine catalyst is selected from the group consisting of triethylenediamine, triethylamine N,N,N',N'-tetra-methyl-1,3-butanediamine, dimethylethanolamine, ethyldiethanolamine, N,N-dimethylcyclohexylamine, N-ethylmorpholine, N-methylmorpholine, 1,8-diazacyclo(5.4.0)undecene-7, bis(2-dimethylamino-ethyl)ether, trimethylaminoethyl piperagine, methylhydroxyethyl piperazin, N,N,N',N'-tetra-methylhexamethylenediamine, N,N,N',N'-tetramethyl-propylenediamine, N,N,N',N',N''-pentamethyl diethylenetriamine, N-trioxyethylene-N,N-dimethyl-amine, N,N,N'-trimethylaminoethyl ethanolamine and mixtures thereof.

4. The process according to claim 1, wherein the organic isocyanate is selected from the group consisting of m-phenylenediisocyanate, p-phenylenediisocyanate, 2,4-tolylene diisocyanate, 2,6-tolylenediisocyanate, chlorophenylene-2,4-diisocyanate, crude diphenylmethane diisocyanate and mixtures 5. The process according to claim 1, wherein the raw material further comprises a flame retardant, pigment or inorganic filler.

* * * * *